US012405188B2

(12) United States Patent
Li et al.

(10) Patent No.: US 12,405,188 B2
(45) Date of Patent: Sep. 2, 2025

(54) APPARATUS OF MEASURING GRAPHITE RADIOACTIVITY, SAMPLING DEVICE, AND SAMPLING METHOD

(71) Applicant: China Institute of Atomic Energy, Beijing (CN)

(72) Inventors: Ruizhi Li, Beijing (CN); Lijun Zhang, Beijing (CN); Xingwang Zhang, Beijing (CN); Jie Wu, Beijing (CN)

(73) Assignee: China Institute of Atomic Energy, Beijing (CN)

( * ) Notice: Subject to any disclaimer, the term of this patent is extended or adjusted under 35 U.S.C. 154(b) by 125 days.

(21) Appl. No.: 17/436,458

(22) PCT Filed: Jun. 8, 2021

(86) PCT No.: PCT/CN2021/098807
§ 371 (c)(1),
(2) Date: Sep. 3, 2021

(87) PCT Pub. No.: WO2022/142140
PCT Pub. Date: Jul. 7, 2022

(65) Prior Publication Data
US 2025/0044195 A1  Feb. 6, 2025

(30) Foreign Application Priority Data
Dec. 29, 2020 (CN) .......................... 202011609836.3

(51) Int. Cl.
*G01N 1/08* (2006.01)
(52) U.S. Cl.
CPC ...................................... *G01N 1/08* (2013.01)

(58) Field of Classification Search
CPC ........ G01N 1/08; G21C 17/00; G21C 17/042; G21C 17/021; Y02E 30/30; G21D 1/003
(Continued)

(56) References Cited

U.S. PATENT DOCUMENTS

| 2005/0183886 A1 | 8/2005 | Masui et al. |
| 2014/0131165 A1* | 5/2014 | Johnson, Jr. ......... G01N 33/222 198/339.1 |
| 2022/0148746 A1* | 5/2022 | Charters ................ G21D 1/003 |

FOREIGN PATENT DOCUMENTS

| CN | 204789019 U | 11/2015 |
| CN | 209040753 U | 6/2019 |

(Continued)

OTHER PUBLICATIONS

Extended European Search Report for PCT Application No. PCT/CN2021/098807 dated Jan. 3, 2023 (11 pages).

(Continued)

*Primary Examiner* — John E Breene
*Assistant Examiner* — Truong D Phan
(74) *Attorney, Agent, or Firm* — Merchant & Gould P.C.

(57) ABSTRACT

The present disclosure provides a sampling device of acquiring a graphite sample from a reactor graphite block, and the sampling device includes: a support placed on the reactor graphite block; a lifter configured to be insertable into the reactor graphite block in a first direction; a sampling actuator arranged at an end of the lifter and configured to acquire a graphite sample from the reactor graphite block. The sampling actuator is configured to insert into the reactor graphite block in a second direction, and the first direction is substantially perpendicular to the second direction.

20 Claims, 9 Drawing Sheets

(58) Field of Classification Search
USPC .......................... 73/864.44; 376/260; 264/0.5
See application file for complete search history.

(56) References Cited

FOREIGN PATENT DOCUMENTS

| CN | 110398389 A   | 11/2019 |
|----|---------------|---------|
| CN | 211477679 U   | 9/2020  |
| CN | 112557092 A   | 3/2021  |
| FR | 1508238 A     | 1/1968  |
| RU | 2378510 C1 *  | 1/2010  |
| RU | 2618214 C1    | 5/2017  |

OTHER PUBLICATIONS

PCT International Search Report for PCT Application No. PCT/CN2021/098807 mailed Mar. 9, 2021 (5 pages).
Qiu et al., "Development on Analysis and Making Sample Experiment Systsem of 14C in Graphite in Decommissioning of Reactor," 2010, Atomic Energy Science and Technology, 44(Suppl.):119-123 (English Abstract).

* cited by examiner

APPARATUS OF MEASURING GRAPHITE RADIOACTIVITY, SAMPLING DEVICE, AND SAMPLING METHOD

CROSS REFERENCE TO RELATED APPLICATION(S)

The present disclosure is a Section 371 National Stage Application of International Application No. PCT/CN2021/098807, filed on Jun. 8, 2021, entitled "APPARATUS OF MEASURING GRAPHITE RADIOACTIVITY, SAMPLING DEVICE, AND SAMPLING METHOD", and the PCT Application claims priority to the Chinese Patent Application No. 202011609836.3 filed on Dec. 29, 2020, which are incorporated herein by reference in their entirety.

TECHNICAL FIELD

The present disclosure relates to a sampling device, and in particular to a sampling device of remotely sampling on a deep hole sidewall of a graphite block.

BACKGROUND

When it is required to take a certain weight of graphite sample from an inner wall of a vertical through hole in a reactor graphite block, the sample may only be taken by a remote operation because the graphite block is radioactive due to a long-term operation of the reactor and it is not allowed to destroy the reactor structure before the reactor is dismantled. According to the reactor structure and sampling requirements, a set of remote sampling tools is designed to perform a task of sampling on a sidewall of a vertical deep hole of a graphite block.

SUMMARY

A brief overview of the present disclosure is given below in order to provide a basic understanding of certain aspects of the present disclosure. It should be understood that the overview is not an exhaustive overview of the present disclosure. It is not intended to determine a key or important part of the present disclosure, nor is it intended to limit the scope of the present disclosure. Its purpose is merely to present some concepts in a simplified form as a prelude to a more detailed description to be described later.

In view of the above requirements, the present disclosure provides a sampling device of acquiring a graphite sample from a reactor graphite block, including: a support placed on the reactor graphite block; a lifter configured to be insertable into the reactor graphite block in a first direction; and a sampling actuator arranged at an end of the lifter and configured to acquire a graphite sample from the reactor graphite block, wherein the sampling actuator is configured to insert into the reactor graphite block in a second direction, and the first direction is substantially perpendicular to the second direction.

These and other advantages of the present disclosure will be more apparent through the following detailed description of the preferred embodiments of the present disclosure in conjunction with the accompanying drawings.

BRIEF DESCRIPTION OF THE DRAWINGS

In order to further illustrate the above and other advantages and features of the present disclosure, the specific embodiments of the present disclosure will be further described in detail below with reference to the accompanying drawings. The drawings together with the following detailed description are included in the specification and form a part of the specification. Elements with the same function and structure are denoted by the same reference numerals. It should be understood that these drawings are only used to describe typical examples of the present disclosure, and should not be regarded as limiting the scope of the present disclosure, and in the drawings.

DETAILED DESCRIPTION OF EMBODIMENTS

Figure 1:
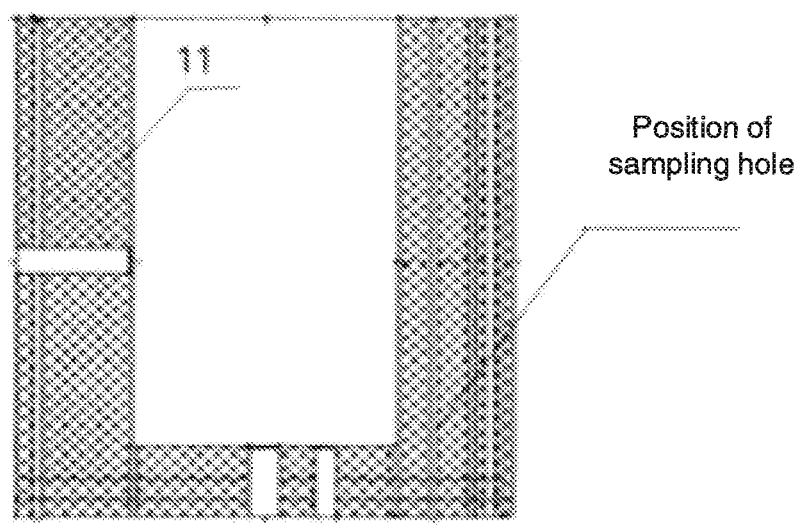
FIG. 1 shows a schematic longitudinal cross-sectional view of a structure of graphite block masonry in a reactor according to some embodiments.

Exemplary embodiments of the present disclosure will be described below in conjunction with the accompanying drawings. For the sake of clarity and conciseness, not all features of the actual implementations are described in the specification. However, it should be understood that it is necessary to make many implementation-specific determinations, for example, to comply with system and business-related restrictions, during a development of any such actual implementation in order to achieve developer's specific objectives. These restrictions may vary with different implementations. In addition, it should be understood that although the development work may be very complicated and time-consuming, such development work is only a routine task for those skilled in the art who benefit from the content of the present disclosure.

Here, it should be further noted that, in order to avoid obscuring the present disclosure due to unnecessary details, only the device structure and/or processing steps closely related to the solution according to the present disclosure are shown in the drawings, and other details of little relevance to the present disclosure are omitted.

Because the graphite is radioactive due to a long-term operation of the reactor and it is not allowed to destroy a structure of the reactor before the reactor is dismantled, sampling may only be performed through a remote operation. For example, a certain weight of graphite block sample may be acquired from an inner sidewall of a vertical through hole on the graphite block. A sampling point is far away from an operating position, for example, a position of a sampling hole is about 3.5 m away from an upper surface of the graphite block. For example, a certain weight of graphite block sample may be acquired by drilling from a designated position on an inner wall of a (D55 mm deep hole in a vertical direction of the graphite block in the reactor. The graphite block sample is required to be complete and have a weight of no less than 3 g. For example, it is required that a temperature of a graphite surface during drilling does not exceed 50° C.

At present, there is no dedicated tool of sampling on a sidewall of a deep hole of the radioactive graphite block in the reactor. No mature tools or technologies in China can be directly used, and no published papers or patented technologies in foreign countries can be used for reference. Therefore, it is necessary to design a set of remote sampling tools according to the structure of the reactor and sampling requirements, so as to perform the task of sampling on the sidewall of the vertical deep hole of the graphite block.

According to the present disclosure, the remote sampling on the sidewall of the deep hole of the graphite block may be successfully performed without destroying the structure of the reactor and the graphite. A graphite sample with a length of 10 mm and a diameter of 8 mm was taken out, which may meet requirements of subsequent experimental analysis. The above-mentioned specifications of the acquired sample are only examples, and do not constitute a limitation to the sampling device of the present disclosure. The sampling device provided according to the present disclosure may also be used to sample a graphite sample of other specifications.

Structure of Deep Hole of Graphite in Reactor

Figure 2:
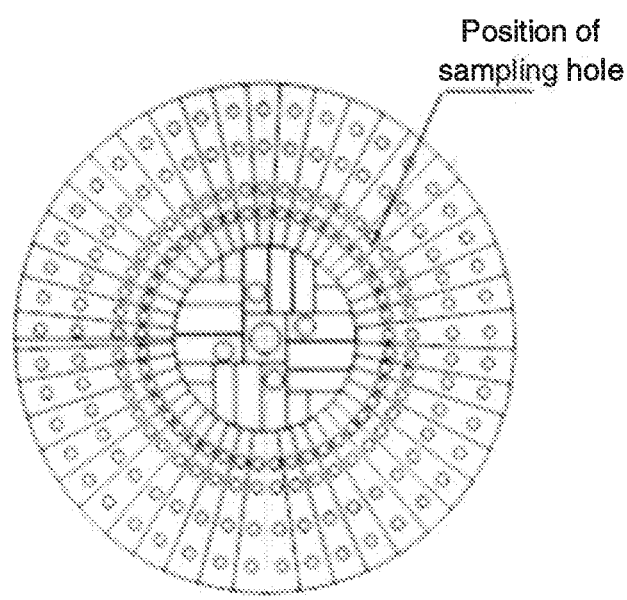
FIG. 2 shows a schematic horizontal cross-sectional view of a structure of graphite block masonry in a reactor according to some embodiments.

A ring structure formed by graphite masonry is arranged in the reactor. FIG. 1 and FIG. 2 show schematic structural diagrams of the graphite block. FIG. 1 shows a schematic longitudinal cross-sectional view of a structure of graphite block masonry in a reactor. FIG. 2 shows a schematic horizontal cross-sectional view of a structure of graphite block masonry in a reactor. In some embodiments, the graphite block masonry has following parameters: an inner diameter of $\Phi 1.43$ m, an outer diameter of $\Phi 2.63$ m, a height of 3 m, and a graphite density of 2.4 g/cm$^3$.

A vertical through hole of $\Phi 55$ mm is arranged on the graphite block.

Figure 3:
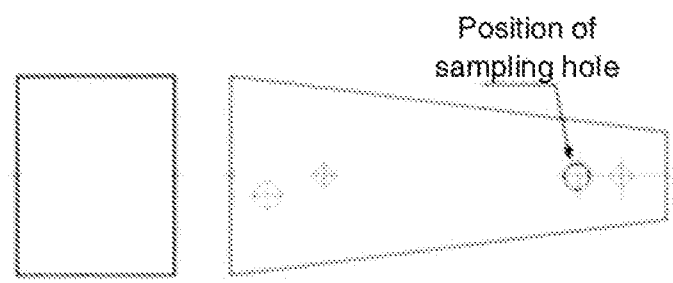
FIG. 3 shows a schematic diagram of a sampling position in a deep hole of a reactor graphite block according to some embodiments.
Figure 4:
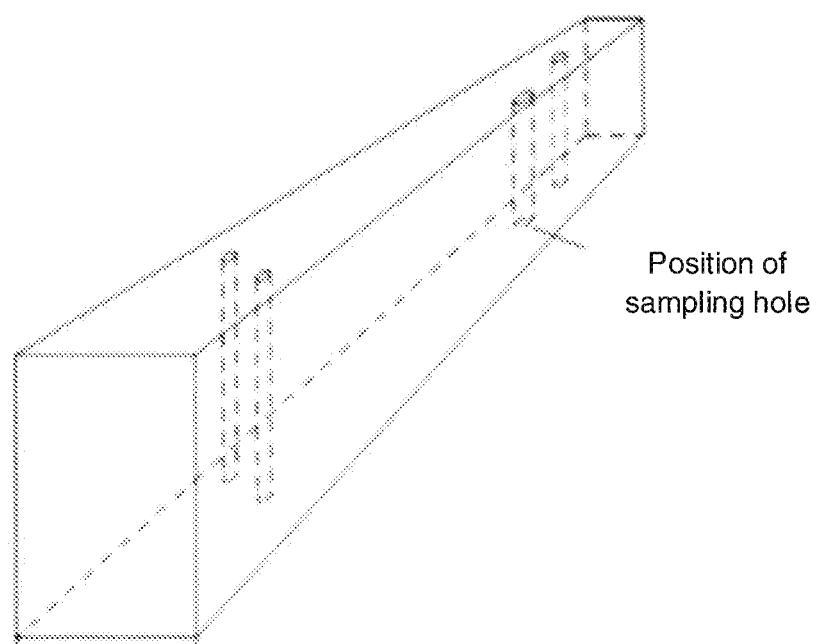
FIG. 4 shows a schematic diagram of a sampling position in a reactor graphite block according to some embodiments.

An operating position is, for example, 3.5 m above the graphite block. Referring to FIG. 3 and FIG. 4, each graphite block includes vertical round holes of $\Phi 55$ mm and $\Phi 33$ mm, but only the round hole of $\Phi 55$ mm may be used for sampling. FIG. 3 shows a schematic diagram of a sampling position in a deep hole of a reactor graphite block. FIG. 4 shows a schematic diagram of a sampling position in a reactor graphite block. FIG. 3 and FIG. 4 show the position of the sampling hole.

Sampling requirements are as follows.

(1) The diameter of the graphite hole is only 55 mm, and the space is narrow.
(2) After drilling a hole in a sidewall of the graphite hole, the graphite sample is cut off and taken out by a sampling actuator.
(3) The graphite temperature may not exceed 50° C. during sampling.

According to some embodiments of the present disclosure, a sampling device of acquiring a graphite sample from a reactor graphite block is provided. The sampling device may include a support, a lifter, and a sampling actuator. The support is placed on the reactor graphite block. Referring to FIG. 6, for example, a graphite sidewall sampling machine 10 is placed on a reactor graphite block 11. The lifter may be, for example but not limitation, a lifting and rotating mechanism for sampling 3 shown in FIG. 5. The lifter may be inserted into the reactor graphite block in a first direction. The sampling actuator is arranged at an end of the lifter and is used to acquire a graphite sample from the reactor graphite block. The sampling actuator may be inserted into the reactor graphite block in a second direction, and the first direction is substantially perpendicular to the second direction. Referring to FIG. 6, the first direction is a direction in which the graphite sidewall sampling machine 10 rises and falls in the reactor graphite block 11, and the second direction is a direction in which the sampling actuator feeds in the reactor graphite block 11.

A caster is installed at a bottom of the support to move the support on the reactor graphite block, so that the lifter is aligned with a sampling position of the reactor graphite block.

The sampling position is a vertical through hole of the reactor graphite block, and the lifter is movable up and down in the vertical through hole of the reactor graphite block in the first direction.

According to some embodiments of the present disclosure, the support may further include: a lifting fixed holder 2 fixed on an upper part of the support 1; a guide rail arranged on the lifting fixed holder 2, and the lifter being movable on the guide rail in the first direction; and a locking device used to lock the lifter on the guide rail.

Figure 5:
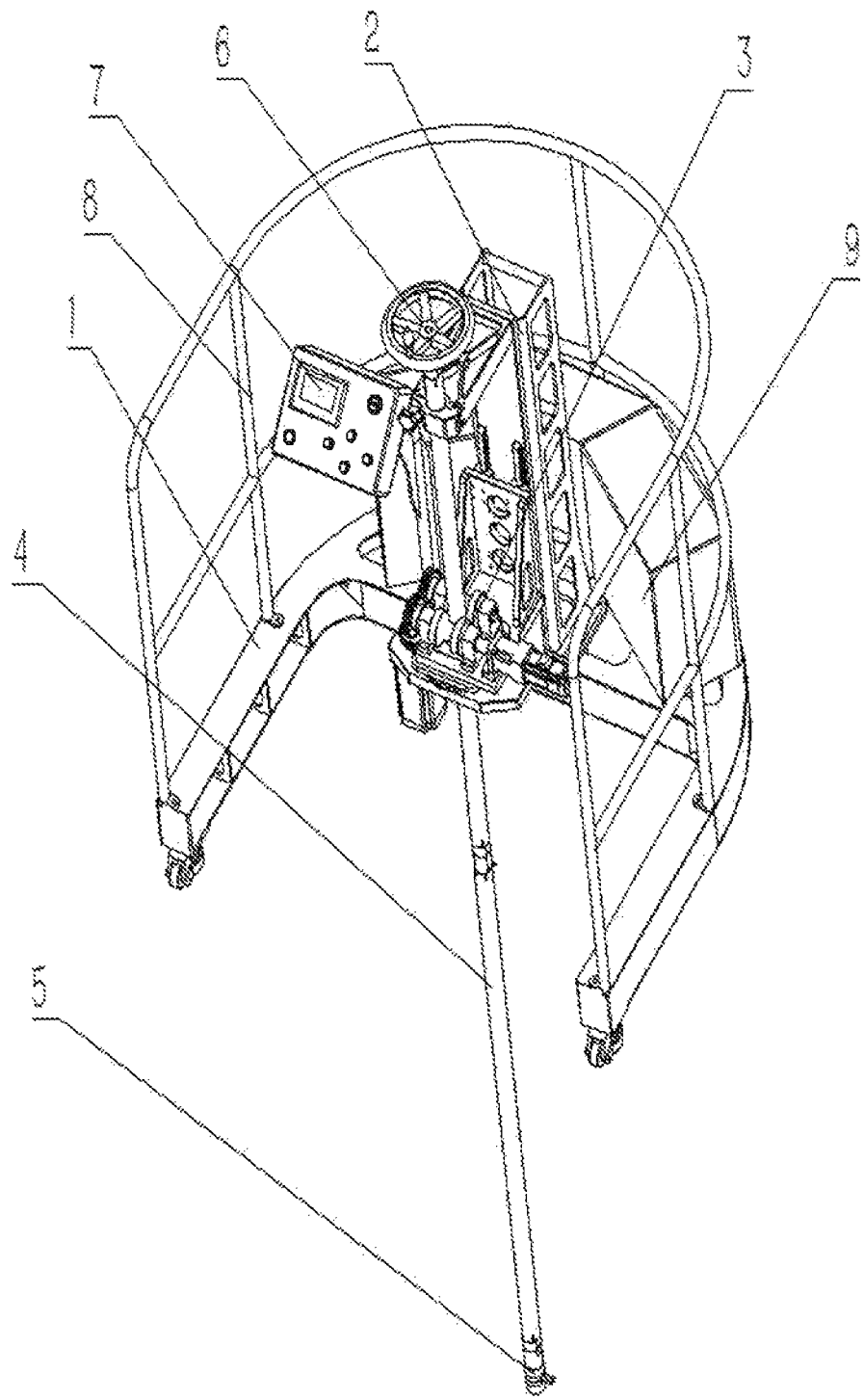
FIG. 5 shows an overall schematic diagram of a sampling device of sampling on a reactor graphite block deep hole sidewall according to some embodiments.
Figure 6:
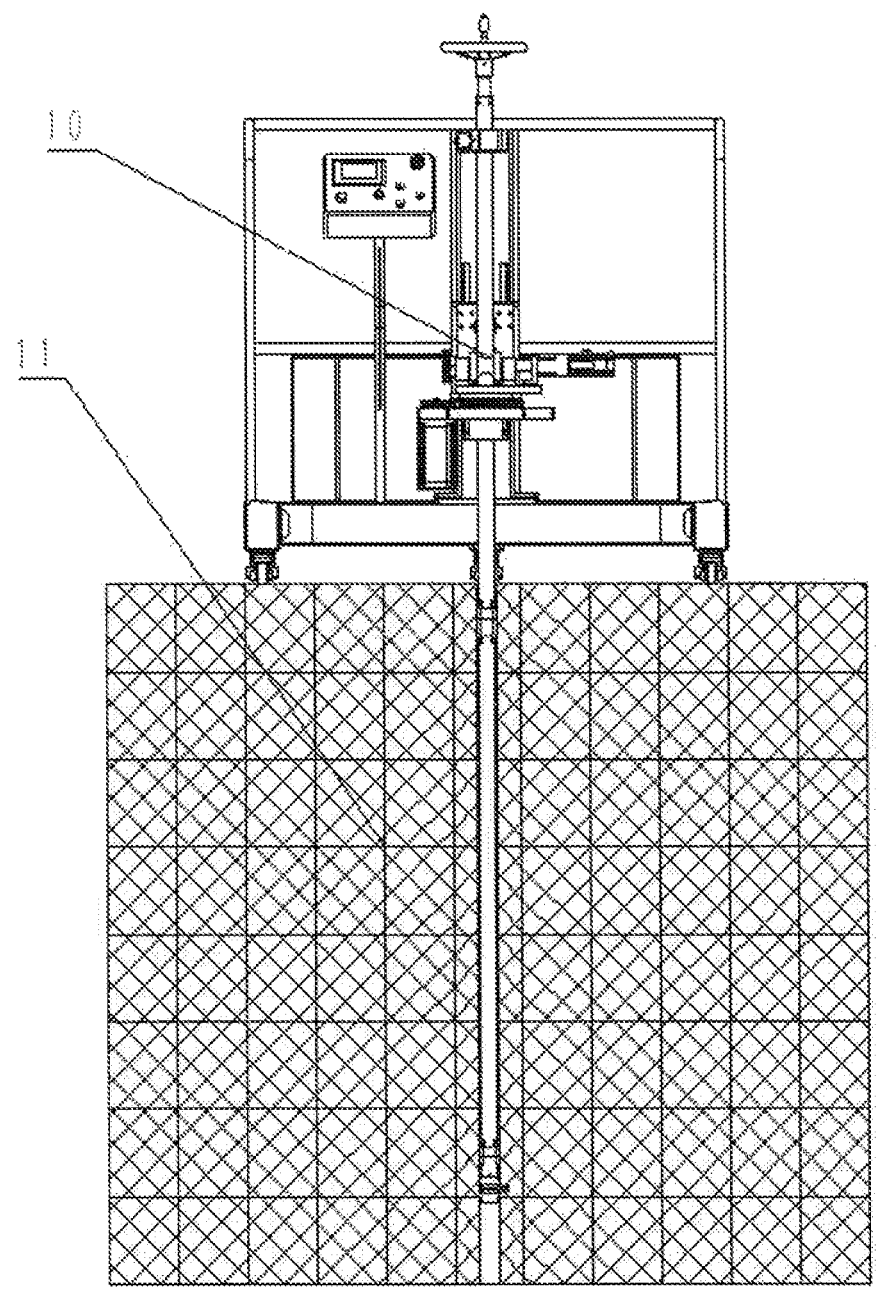
FIG. 6 shows a schematic diagram of a state in which the sampling device of sampling on the reactor graphite block deep hole sidewall is in place and in operation according to some embodiments.

According to some embodiments of the present disclosure, the lifter may include: a lifting rod that may be, by way of example but not limitation, a sampling operation rod 4 shown in FIG. 5.

The lifting rod may be inserted into the reactor graphite block in the first direction from the sampling position of the reactor graphite block.

According to some embodiments of the present disclosure, the lifting rod is a telescopic rod including a plurality of segments that are extendable and retractable in the first direction. Each of the plurality of segments may include: a mandrel arranged at a center of the telescopic rod; and a sleeve arranged around the mandrel on a periphery of the mandrel. The mandrel is extendable and retractable in the first direction to reach a desired length of the telescopic rod. Those skilled in the art may know that the mandrel may be driven hydraulically or electrically.

According to some embodiments of the present disclosure, the sampling actuator 5 is installed at a bottom of the lifting rod, and a sampling operation wheel 6, for example, a manual sampling operation wheel 6, is installed at a top of the lifting rod and is used to actuate the sampling actuator. Those skilled in the art may know that the sampling operation wheel may also be driven electrically.

According to some embodiments of the present disclosure, a turn counter is installed on an upper part of the sampling operation wheel so as to record a feeding depth of the sampling actuator.

According to some embodiments of the present disclosure, the lifter may include a clamping mechanism and a rotating mechanism. The clamping mechanism is used to clamp the telescopic rod. By way of example but not limitation, the clamping mechanism may include a clamping wheel, a clamping mechanism reducer and a clamping mechanism servo motor. The rotating mechanism is used to drive, by rotation, the telescopic rod to move in the first direction. By way of example but not limitation, the rotating mechanism may include a gear, a rotating mechanism reducer and a rotating mechanism servo motor.

According to some embodiments of the present disclosure, the sampling actuator may include: a connecting sleeve 5-1 for connecting the sampling actuator 5 to the lifter; a transmission shaft 5-4 arranged in the connecting sleeve 5-1 and used to transmit a rotating power; and a rotary drill 5-11 that may rotate and travel in the second direction so as to cut graphite around the graphite sample 12.

Figure 7:
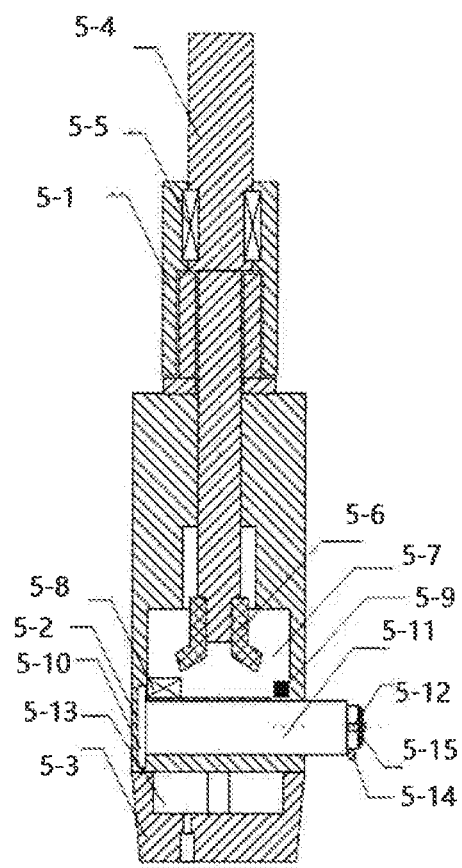
FIG. 7 shows a schematic diagram of a drilling and sampling actuator of the sampling device of sampling on the reactor graphite block deep hole sidewall according to some embodiments.

According to some embodiments of the present disclosure, at least one cutting blade, for example but not limitation, a sampling knife 5-12 shown in FIG. 7, is arranged on an outer circumference of the rotary drill 5-11.

According to some embodiments of the present disclosure, the transmission shaft may transmit rotating power so that the rotary drill moves between a feeding state and a cutting state. In the feeding state, the rotary drill rotates forward, and a cutting cam 5-14 follows the rotary drill and rotates in close contact with the graphite sample. In the cutting state, the rotary drill rotates reversely and applies a radial force toward the graphite sample so as to cut off the graphite sample from the reactor graphite block.

According to some embodiments of the present disclosure, a cutting cam 5-14 is provided at an end of the rotary drill and is used to cut off the graphite sample from the reactor graphite block. The cutting cam is fixed on the rotary drill through a fixing pin 5-15, and the cutting cam 5-14 may move reversely with the rotary drill with the fixing pin 5-15 as a center. As the cutting cam 5-14 rotates, a linear distance between a bonding surface of the cutting cam with the graphite sample and the fixing pin increases, so that the cutting cam applies a radial force toward the graphite sample to cut off the graphite sample.

According to some embodiments of the present disclosure, the rotary drill 5-11 is a hollow structure with a hollow inner cavity, and the graphite sample 12 cut off falls into the inner cavity of the rotary drill 5-11.

According to some embodiments of the present disclosure, the cutting cam is provided with a tooth surface on a side close to the graphite sample. A dimension of the cutting cam is set to prevent the graphite sample from falling out of the inner cavity of the rotary drill.

According to some embodiments of the present disclosure, the sampling device 10 is a sampling device of remotely sampling in a reactor graphite deep hole, which may be, for example, a graphite sidewall sampling device 10 shown in FIG. 5. The graphite sidewall sampling device 10 may include: a fixed support 1, a lifting fixed holder 2, a lifting and rotating mechanism for sampling 3, a sampling operation rod 4, a sampling actuator 5, a manual sampling operation wheel 6, an operation control panel 7, a safety fence 8 and a distribution box 9.

According to some embodiments of the present disclosure, a caster is installed at the bottom of the fixed support 1 to facilitate the movement of the sampling device 10 and the alignment with the sampling hole. The lifting fixed holder 2 is welded to the upper part of the fixed support 1. The lifting and rotating mechanism for sampling 3 is installed on the lifting fixed holder 2 through the guide rail and the locking device, and may move up and down along the guide rail. A sampling operation rod clamping mechanism and a rotating mechanism are installed on the lifting and rotating mechanism for sampling 3. The sampling operation rod clamping mechanism includes a clamping wheel, a reducer and a servo motor. The rotating mechanism includes a gear, a reducer, and a servo motor. The sampling operation rod 4 includes a plurality of segments of stainless steel tubes and mandrels. A sampling actuator 5 is installed at the bottom of the sampling operation rod 4, and a manual sampling operation wheel 6 is installed at the top of the sampling operation rod 4. A length of the sampling operation rod 4 is determined by a number of the segments. The sampling actuator 5 is used for the sampling operation on the sidewall of the graphite 11. The manual sampling operation wheel 6 is used to provide a driving force for the sampling on the sidewall of the graphite 11. A turn counter is installed on the upper part of the manual sampling operation wheel 6 to record a feeding depth of the sampling actuator 5. A button provided on the operation control panel 7 may be operated to control the lifting and rotating of the sampling operation rod 4. The safety fence 8 is formed by welding conventional steel pipes to prevent unrelated persons from approaching the operating position. The distribution box 9 is used to install a servo motor controller and other electrical components.

The sampling actuator 5 is a key component of the device, and the overall design is shown in FIG. 7. Main functions of various components of the actuator are described as follows. The connecting sleeve 5-1 is connected with the sampling operation rod 4 in FIG. 5; a upper fixed seat 5-2 and the connecting sleeve 5-1 are fixed by a bolt; a lower fixed seat 5-3 is also fixed to the upper fixed seat 5-2 with a bolt; the upper fixed seat 5-2 and the lower fixed seat 5-3 simultaneously fix the rotary sampling device. The transmission shaft 5-4 transmits the upper rotating power to the rotary drill 5-11, and is connected with a driving helical gear 5-6 through a bolt; a bearing 5-5 includes a pair of angular contact bearings to prevent the transmission shaft 5-4 from moving up and down; the driven helical gear 5-7 is a welded part formed by welding a spline sleeve and a helical gear and is used to transmit the power of the driving helical gear 5-6 to the screw 5-10; the screw 5-10 is fixed to the fixed support 5-13, and an outer circumference of the screw 5-10 is processed into a special pitch external thread; a bearing 5-8 and a bearing 5-9 fix the driven helical gear 5-7 in the radial direction; the outer circumference of the rotary drill 5-11 is processed with a spline matching with the spline sleeve, and the inner circumference is processed into an internal thread that matches the special external thread of the screw 5-10, and the top is welded with the sampling knife 5-12; the sampling knife 5-12 is used to cut the graphite around the graphite sample 12; the specially designed cutting cam 5-14 may cut off the graphite sample 12 when the rotary drill 5-11 reversely rotates to return, and prevent the graphite sample 12 from falling out of the inner cavity of the rotary drill 5-11; the fixing pin 5-15 is used to fix the cutting cam 5-14.

Figure 8:
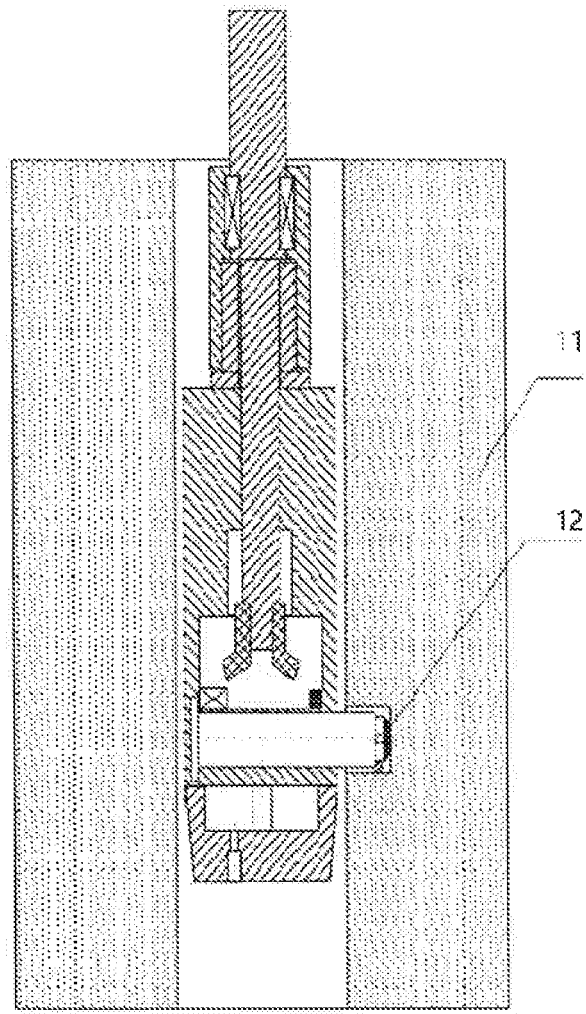
FIG. 8 shows a partial enlarged schematic diagram of the drilling and sampling actuator of the sampling device of sampling on the reactor graphite block deep hole sidewall according to some embodiments.
Figure 9:
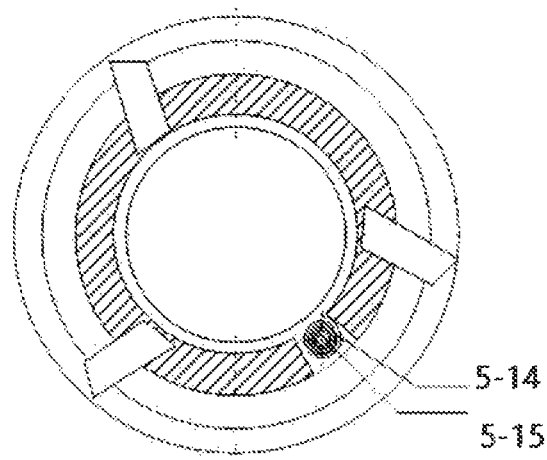
FIG. 9 shows a schematic diagram of an operating state of a cutting cam of the drilling and sampling actuator of the sampling device of sampling on the reactor graphite block deep hole sidewall according to some embodiments.

In order to solve the technical problem of cutting off the graphite sample 12, a set of cutting cams are designed in the present disclosure, as shown in FIG. 8 to FIG. 9. When the cutting cam is in the feeding state, the rotary drill 5-11 rotates, and the cutting cam 5-14 follows the rotary drill 5-11 and rotates in close contact with the graphite sample 12. After a certain number of rotations, the cutting cam reaches the cutting state. When the cutting cam is in the cutting state, the rotary drill 5-11 rotates reversely. The cutting cam 5-14 is provided with a specially designed tooth surface on a side of the cutting cam 5-14 closely attached to the graphite sample 12, and the cutting cam 5-14 follows the rotary drill 5-11 to move reversely with the fixing pin 5-15 as the center. As the cutting cam 5-14 rotates, a linear distance between the bonding surface of the cutting cam 5-14 with the graphite sample 12 and the fixing pin 5-15 increases, and the cutting cam 5-14 applies a radial force toward the graphite sample 12. When the radial force is large enough, the graphite sample 12 is cut off and falls into the inner cavity of the rotary drill 5-11. Then, the sampling process ends.

According to some embodiments of the present disclosure, the operation process of the graphite sidewall sampling device 10 is described in detail. FIG. 6 shows an operating state of the graphite sidewall sampling device after it is installed in place.

Firstly, the graphite sidewall sampling device 10 is moved to above the graphite 11. The graphite sidewall sampling device 10 is fixed when it is observed that the sampling actuator 5 is aligned with the sampling hole on the graphite. A sampling depth and a sampling direction are set on the operation control panel 7. A down button is pressed. When the sampling actuator 5 reaches a specified depth, a manual operation is performed so that the manual sampling operation wheel 6 rotates for a specified number of turns, and then rotates reversely for the same number of turns. Then, an up button on the operation control panel 7 is pressed. When the sampling actuator 5 is raised to a specified height, the graphite sample may be taken out. During sampling, the graphite sidewall sampling device 10 is operated as follows. The connecting sleeve 5-1 is connected with the sampling operation rod 4; the transmission shaft 5-4 is rotated to transmit a power to the driving helical gear 5-6, the driving helical gear 5-6 transmits the power to the driven helical gear 5-7, and the driven helical gear 5-7 drives, through the spline, the rotary drill 5 to rotate, and at the same time, the rotary drill 5-11 moves axially through the screw 5-10 to realize the feeding of the rotary drill 5-11; the sampling knife 5-12 on the top of the rotary drill 5-11 cuts the graphite around the graphite sample 12, and when the transmission shaft 5-4 rotates for a certain number of turns, the rotary drill 5-11 reaches a maximum stroke and stops feeding; then, the rotary drill 5-11 starts to rotate reversely, and the rotary drill 5-11 starts to return. At this time, the cutting cam 5-14 installed on the top of the rotary drill 5-11 cuts off the graphite sample 12 under the action of the reverse force, and prevents the graphite sample 12 from falling out of the inner cavity of the rotary drill 5-11. After the transmission shaft 5-4 rotates reversely for the same number of turns, the rotary drill 5-11 returns to an original position. The graphite sidewall sampling device 10 is lifted, and the graphite sample 12 may be taken out.

Finally, it should be noted that the terms "comprise", "include" or any other variants thereof are intended to cover non-exclusive inclusion, so that a process, method, product or apparatus including a series of elements not only includes those elements, but also includes other elements not clearly listed, or further includes elements inherent to this process, method, product or apparatus. Moreover, if there are no more restrictions, the element defined by the sentence "including a . . . " does not exclude the existence of other identical elements in the process, method, product or apparatus that includes the element.

Although the embodiments of the present disclosure have been described in detail above in conjunction with the accompanying drawings, it should be understood that the embodiments described above are only used to illustrate the present disclosure, and do not constitute a limitation to the present disclosure. For those skilled in the art, various modifications and changes may be made to the above embodiments without departing from the essence and scope of the present disclosure. Therefore, the scope of the present disclosure is limited only by the appended claims and their equivalent meanings.

REFERENCE NUMERALS

1 Fixed support
2 Lifting fixed holder
3 Lifting and rotating mechanism for sampling
4 Sampling operation rod
5 Sampling actuator
6 Manual sampling operation wheel
7 Operation control panel
8 Safety fence
9 Distribution box
10 Graphite sidewall sampling machine
11 Graphite
12 Graphite sample
5-1 Connecting sleeve
5-2 Upper fixed seat
5-3 Lower fixed seat
5-4 Transmission shaft
5-5 Bearing
5-6 Driving helical gear
5-7 Driven helical gear
5-8 Bearing
5-9 Bearing
5-10 Screw
5-11 Rotary drill
5-12 Sampling knife
5-13 Fixed support
5-14 Cutting cam
5-15 Fixing pin

What is claimed is:

1. A sampling device of acquiring a graphite sample from a reactor graphite block, comprising:
   a support placed on the reactor graphite block;
   a lifter configured to be insertable into the reactor graphite block in a first direction; and
   a sampling actuator arranged at an end of the lifter and configured to acquire a graphite sample from the reactor graphite block,
   wherein the sampling actuator is configured to insert into the reactor graphite block in a second direction, and the first direction is substantially perpendicular to the second direction,
   wherein a caster is installed at a bottom of the support to move the support on the reactor graphite block, so that the lifter is aligned with a sampling position of the reactor graphite block.

2. The sampling device according to claim 1, wherein the sampling position is a vertical through hole of the reactor graphite block, and the lifter is configured to be movable up and down in the vertical through hole of the reactor graphite block in the first direction.

3. The sampling device according to claim 1, wherein the support further comprises:
   a lifting fixed holder fixed on an upper part of the support.

4. The sampling device according to claim 1, wherein the lifter comprises:
   a lifting rod configured to insert into the reactor graphite block in the first direction from a sampling position of the reactor graphite block.

5. The sampling device according to claim 4, wherein the lifting rod is a telescopic rod comprising a plurality of segments that are extendable and retractable in the first direction.

6. The sampling device according to claim 4, wherein the sampling actuator is installed at a bottom of the lifting rod, and a sampling operation wheel is installed at a top of the lifting rod to actuate the sampling actuator.

7. The sampling device according to claim 1, wherein the lifter comprises:
a clamping mechanism configured to clamp the telescopic rod; and
a rotating mechanism configured to drive, by rotation, the telescopic rod to move in the first direction.

8. The sampling device according to claim 1, wherein the sampling actuator comprises:
a connecting sleeve configured to connect the sampling actuator to the lifter;
a transmission shaft arranged in the connecting sleeve and configured to transmit a rotating power; and
a rotary drill configured to be rotatable and to travel in the second direction.

9. The sampling device according to claim 8, wherein the rotary drill is configured to cut off graphite around the graphite sample; or
wherein at least one cutting blade is arranged on an outer circumference of the rotary drill.

10. The sampling device according to claim 8, wherein the transmission shaft is configured to transmit the rotating power so that the rotary drill moves between a feeding state and a cutting state, and at the feeding state, the rotary drill rotates forward, and at the cutting state, the rotary drill rotates reversely and applies a radial force toward the graphite sample, so as to cut off the graphite sample from the reactor graphite block.

11. The sampling device according to claim 10, wherein a cutting cam is provided at an end of the rotary drill, the cutting cam is fixed on the rotary drill by a fixing pin and is configured to cut off the graphite sample from the reactor graphite block.

12. The sampling device according to claim 11, wherein,
in response to the rotary drill rotating forward, the cutting cam follows the rotary drill and rotates in close contact with the graphite sample;
in response to the rotary drill rotating reversely, the cutting cam moves reversely with the rotary drill with the fixing pin as a center; and
a linear distance between a bonding surface of the cutting cam with the graphite sample and the fixing pin increases with rotation of the cutting cam, so that the cutting cam applies a radial force toward the graphite sample to cut off the graphite sample.

13. The sampling device according to claim 12, wherein the rotary drill is a hollow structure with a hollow inner cavity, and the cut-off graphite sample falls into the inner cavity of the rotary drill.

14. The sampling device according to claim 12, wherein the cutting cam is provided with a tooth surface on a side of the cutting cam in close contact with the graphite sample;
wherein a dimension of the cutting cam is set to prevent the graphite sample from falling out of the inner cavity of the rotary drill.

15. An apparatus of measuring a graphite radioactivity, comprising:
the sampling device according to claim 1, wherein the sampling device is configured to acquire a sample from graphite;
a sample delivery device configured to deliver the sample acquired by the sampling device to a sample preparation device; and
the sample preparation device configured to receive and process the sample from the sample delivery device.

16. The apparatus of measuring the graphite radioactivity according to claim 15, comprising:
an analysis and detection unit, wherein the sampling device is arranged in the analysis and detection unit.

17. The apparatus of measuring the graphite radioactivity according to claim 15, wherein the sampling device comprises:
a support placed on a graphite to be sampled;
a lifter configured to be insertable into the graphite in a first direction; and
a sampling actuator arranged at an end of the lifter, wherein the sampling actuator is configured to insert into the graphite in a second direction, and the first direction is substantially perpendicular to the second direction;
wherein the sampling actuator is movable between a feeding state and a cutting state, and at the feeding state, the sampling actuator rotates forward, at the cutting state, the sampling actuator rotates reversely and applies a radial force toward the sample, so as to cut off the sample from the graphite;
wherein a cutting cam is provided at an end of the sampling actuator,
in response to the sampling actuator rotating forward, the cutting cam follows the rotary drill and rotates in close contact with the sample;
in response to the sampling actuator rotating reversely, the cutting cam moves reversely with the rotary drill; and
with rotation of the cutting cam, the cutting cam applies a radial force toward the sample so as to cut off the sample from the graphite;
wherein the sampling actuator comprises a hollow inner cavity, and the cut-off sample falls into the inner cavity.

18. A sampling device of acquiring a sample from a measurement object, comprising:
a support placed on the measurement object;
a lifter configured to be insertable into the measurement object in a first direction; and
a sampling actuator arranged at an end of the lifter,
wherein the sampling actuator is configured to insert into the measurement object in a second direction, and the first direction is substantially perpendicular to the second direction; and
wherein a caster is installed at a bottom of the support to move the support on the measurement object, so that the lifter is aligned with a sampling position of the measurement object, wherein the measurement object is a graphite sample; or wherein the measurement object is in a radioactive environment.

19. A sampling method of acquiring a sample from a graphite, comprising:
moving a sampling device above the graphite;
fixing the sampling device in response to observing that the sampling device is aligned with a sampling hole on the graphite;
inserting a lifter of the sampling device into the sampling hole in a first direction until the sampling device reaches a depth;
inserting a sampling actuator arranged at an end of the lifter into the graphite in a second direction, wherein the first direction is substantially perpendicular to the second direction; and
moving the sampling actuator between a feeding state and a cutting state, wherein at the feeding state, the sampling actuator rotates forward, and at the cutting state, the sampling actuator rotates reversely and applies a radial force toward the sample, so as to cut off the sample from the graphite;
wherein, a cutting cam is provided at an end of the sampling actuator;

in response to the sampling actuator rotating forward, the cutting cam follows the sampling actuator and rotates in close contact with the graphite sample;

in response to the sampling actuator rotating reversely, the cutting cam moves reversely with the sampling actuator; and with rotation of the cutting cam, the cutting cam applies a radial force toward the sample so as to cut off the sample from the graphite.

20. The sampling method according to claim 19, wherein the sampling actuator comprises a hollow inner cavity, and the cut-off sample falls into the inner cavity of the sampling actuator;

the sampling method further comprising:
rotating the sampling actuator so that the sampling actuator retracts into the lifter of the sampling device;

the sampling method further comprising:
lifting the lifter of the sampling device above the graphite so as to takeout the sample.

* * * * *